United States Patent [19]

Poe

[11] 4,116,479
[45] Sep. 26, 1978

[54] ADJUSTABLE FLUSH MOUNTED HOOK LATCH

[75] Inventor: L. Richard Poe, Long Beach, Calif.

[73] Assignee: Hartwell Corporation, Placentia, Calif.

[21] Appl. No.: 759,752

[22] Filed: Jan. 17, 1977

[51] Int. Cl.² .................. E05C 5/00; E05C 19/12
[52] U.S. Cl. .......................... 292/113; 292/247; 292/DIG. 31; 292/DIG. 60
[58] Field of Search ............... 292/66, 113, 114, 247, 292/250, DIG. 31, DIG. 49, DIG. 60

[56] References Cited

U.S. PATENT DOCUMENTS

| 3,070,396 | 12/1962 | Swanson | 292/247 |
| 3,259,411 | 7/1966 | Griffiths | 292/113 |
| 3,664,696 | 5/1972 | Poe | 292/113 |

Primary Examiner—Robert L. Wolfe
Attorney, Agent, or Firm—Lyon & Lyon

[57] ABSTRACT

A flush mounted latch, particularly suited for aircraft, and including a housing, which also serves as a handle and a hook latch, engagable with a keeper, the handle-housing having a first pivotal axis and the hook latch having a second pivotal axis. Between the two axes is disposed a tension adjustor externally accessible without disengaging the hook latch from its keeper for causing the hook latch to exert an optimum retaining force on the keeper.

7 Claims, 17 Drawing Figures

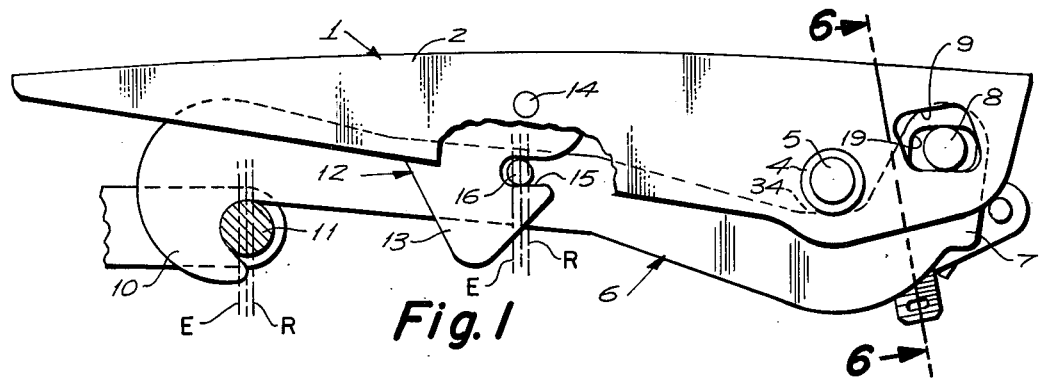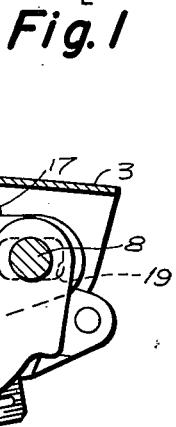

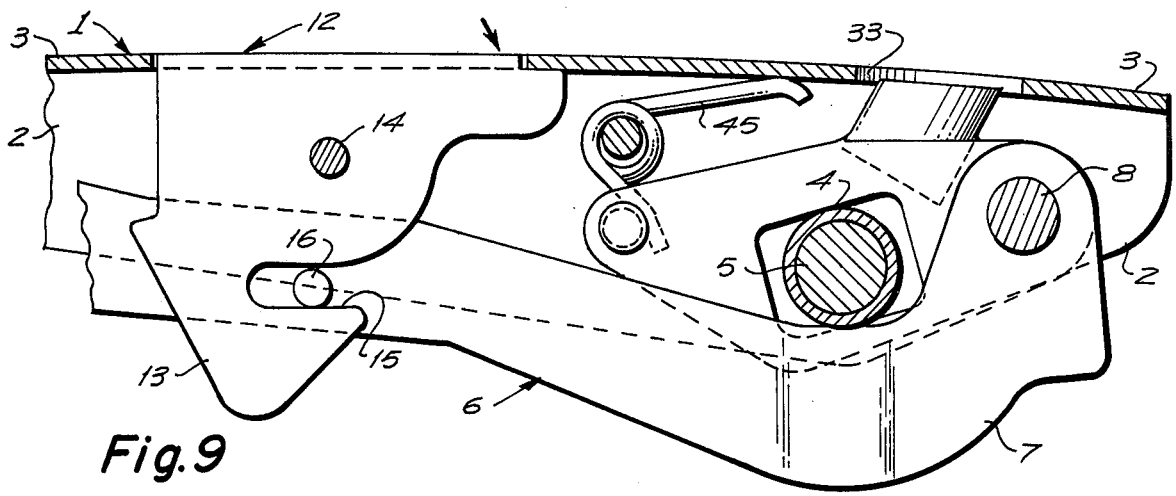
Fig. 9
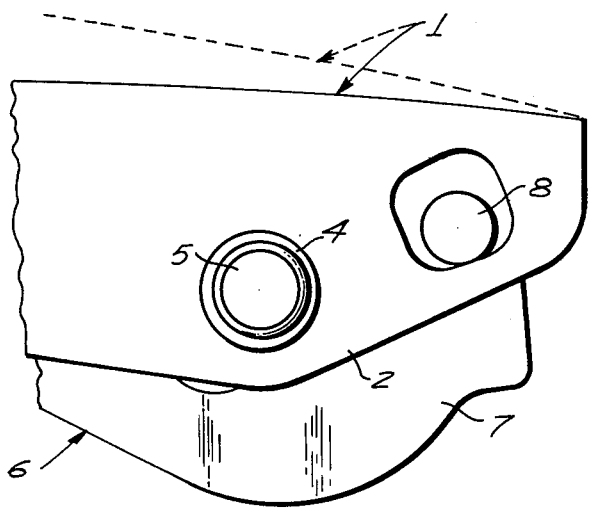
Fig. 10
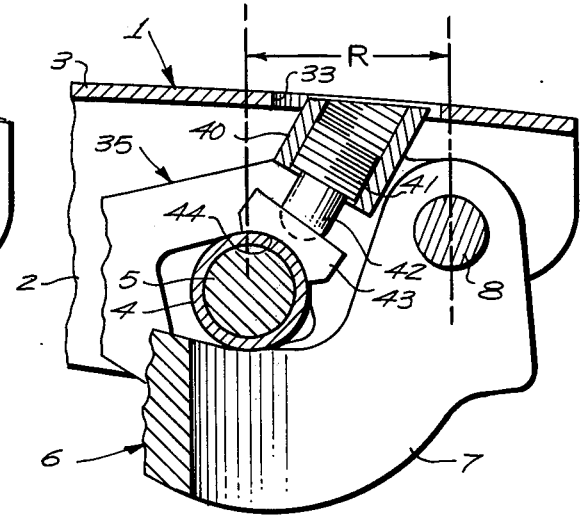
Fig. 11
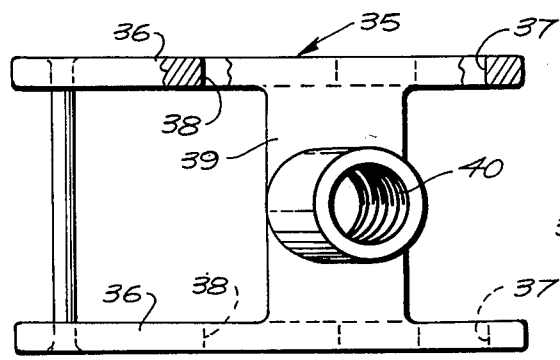
Fig. 13
Fig. 14
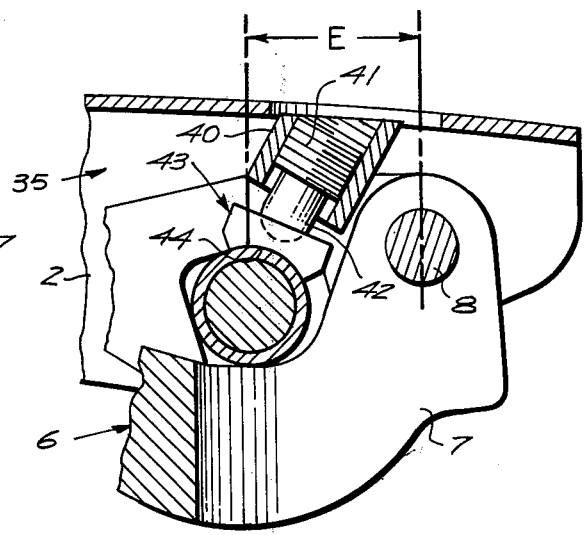
Fig. 12

ADJUSTABLE FLUSH MOUNTED HOOK LATCH

BACKGROUND

Flush latches of the hook type such as shown in U.S. Pat. Nos. 2,712,955; 2,904,141 and 3,542,410 are widely used on aircraft and are subject to substantial stress. Because of the possible damage or even total loss of an aircraft should the latch fail, great care is exercised to make sure that the latch is safe and that any play or free movement between the hook latch and its keeper be eliminated. Heretofore, such adjustment was made when the latch was disengaged. This required time consuming adjustment-test-readjustment-test until the latch was functioning properly. Also, when disengaged, there was always the chance of accidental engagement with the adjusting means which might alter the adjustment.

SUMMARY

The present invention is directed to a flush latch particularly adapted for aircraft which overcomes the problems indicated and which is summarized in the following objects:

First, to provide a flush latch of the type having a pivotal housing which also serves as a handle, and a pivotal hook latch, wherein a novelly arranged externally accessible tension adjustor is disposed between the pivotal axes of the housing-handle and the hook latch.

Second, to provide in a flush latch, of the type indicated, a tension adjustor, one embodiment of which utilizes a wedge element, forced between journals defining the axes of the housing-handle and the hook latch by an externally exposed socket head whereby adjustment may be made when the flush latch is fully closed.

Third, to provide in a flush latch, of the type indicated, a tension adjustor, another embodiment of which utilizes a thrust unit having an externally accessible thrust pin engaging a thrust plate fitting a shaft defining one of the pivotal axes.

Fourth, to provide in a flush latch, of the type indicated, a tension adjustor, a further embodiment of which utilizes a collar journalled on a shaft defining one of the pivotal axes and a screwthreaded thrust pin engaging a shaft defining the other of the pivotal axes, the thrust pin being accessible upon limited initial opening of the housing-handle.

BRIEF DESCRIPTION OF THE FIGURES

FIGS. 1 through 8 illustrate one embodiment of the adjustable flush mounted hook latch in which:

FIG. 1 is a side view of the latch shown in its flush or secured position.

FIG. 2 is a fragmentary plan view showing the exposed side of the flush mounted latch.

FIG. 3 is a fragmentary sectional view taken through 3—3 of FIG. 2 showing the parts in approximately mid-adjustment corresponding to the position shown in FIGS. 1 and 2.

FIG. 4 is a fragmentary sectional view taken through 4—4 of FIG. 2 showing the adjustment in which the hook latch is in its extended position.

FIG. 5 is a similar fragmentary sectional view showing the hook latch in its retracted position.

FIG. 6 is a transverse sectional view taken through 6—6 of FIG. 1.

FIG. 7 is a top view of the anchor bar forming a part of the adjustor.

FIG. 8 is a top view of the wedge bar, also forming part of the adjustor.

FIGS. 9 through 14 illustrate another embodiment of the adjustable flush mounted hook latch in which:

FIG. 9 is an enlarged fragmentary sectional view corresponding to 3—3 of FIG. 2.

FIG. 10 is an enlarged fragmentary side view corresponding to FIG. 1.

FIGS. 11 and 12 are enlarged fragmentary sectional views corresponding to 4—4 of FIG. 2, FIG. 11 showing the hook lever in its maximum retracted position and FIG. 12 showing the hook lever in its maximum extended position.

FIG. 13 is a plan view of the link structure forming a part of the adjustor.

FIG. 14 is a bottom view of the thrust plate forming a part of the adjustor.

FIGS. 15, 16 and 17 illustrate a further embodiment of the adjustable flush mounted hook latch in which:

FIG. 15 is an enlarged fragmentary side view corresonding to FIG. 1.

FIG. 16 is a fragmentary sectional view corresponding to 4—4 of FIG. 2.

FIG. 17 is a fragmentary sectional view taken through 17—17 of FIG. 16.

DETAILED DESCRIPTION

Figure 15:
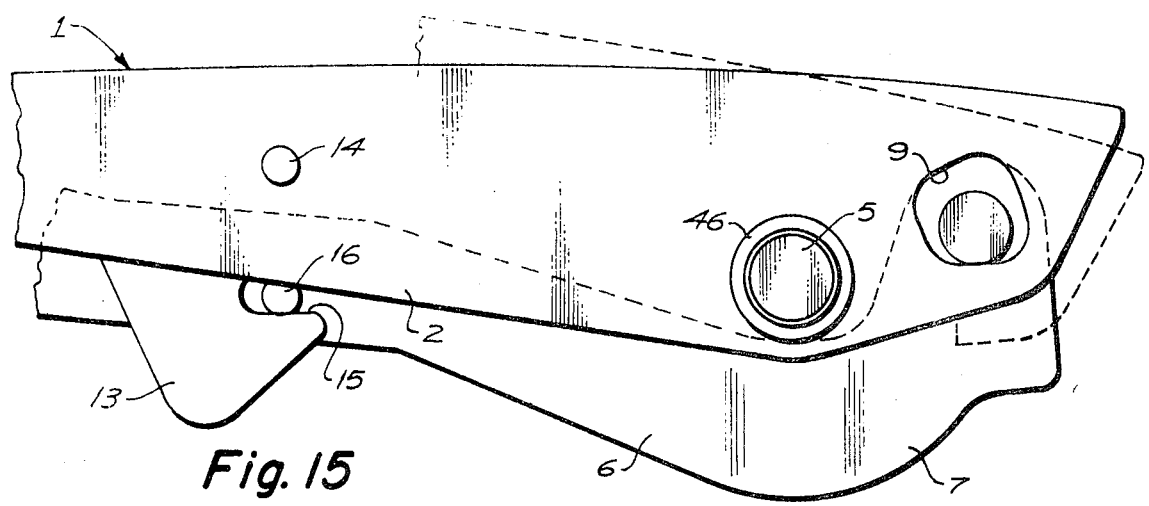

Referring first to the embodiment shown in FIGS. 1 through 8, the latch includes a channel-shaped handle 1 having parallel side walls 2 and a connecting web 3. The connecting web which forms the outer exposed surface of the handle is contoured to form to the surface of the structure in which the handle is mounted.

The side walls 2 have end portions of major widths which are joined by a tubular pivot shaft 4 which receives a journal pin 5. The journal pin projects beyond the pivot shaft 4 and the side walls 2 and is received in a suitable bearing, not shown.

The handle 1 receives a latch arm 6 longitudinally therein. The latch arm includes a bifurcated end 7 disposed between the journal pin 5 and the near end of the handle. The bifurcated end receives a journal shaft 8, the extremities of which extend through movement control slots 9 in the side walls 2 which permit limited radial and circumferential displacement of the journal shaft 8 relative thereto.

The latch arm curves from the journal shaft 8 downwardly and under the tubular pivot shaft 4 and continues to a point adjacent the extended end of the handle 1. Its extremity is curved downward to form a hook end 10. The hook end engages a keeper member 11 which is suitably secured to a fixed member in the structure which receives the latch.

At its midportion, the handle 1 receives a trigger lever 12 which is channel-shaped and includes essentially triangular side walls 13 capable of pivotal movement about a shaft 14. The side walls 13 are provided with a pair of hook elements 14 which straddle the latch arm 6. The latch arm 6 is provided with a cross pin 16 which engages the hook elements 16.

In addition to the side walls 2, the tubular pivot shaft 4 and journal shaft 8 are joined by a pair of link plates 17 having bearing perforations 18 permitting rotation about the axis of the tubular pivot shaft 4 and radial movement control slots 19 which receive the journal shaft 8. The link plates 17 are joined by cross pins 20 and 21 which support a spring 22 in such a manner as to provide an upward force on the handle 1.

Except for the movement control slots 9 and 19, the structure thus far described may be considered as conventional, and in this regard, reference is made to U.S. Pat. No. 2,712,955.

In the exercise of the present invention, an anchor bar 23 is disposed under the tubular pivot shaft 4 and journal shaft 8 and is provided with bearing faces 24 and 25 which engage these shafts. The anchor bar is also provided with a screw-threaded bore 26 which receives an adjustment bolt 27 extending downwardly between the shafts 4 and 8. The adjustment bolt receives a wedge bar 28 having diverging faces which engage the shafts 4 and 8 in opposition to the bearing faces 24 and 25 so that when the adjustment bolt 27 is screwed into the bore 26, the shafts 4 and 8 are forced apart. The anchor bar is provided with a pair of lugs 29 which receive therebetween a spring 30 retained by a pin 31.

In order to prevent the bolt 27 from being removed, its extremity may be provided with a cotter pin 32.

The head of the bolt 27 which is preferably the Allen head type is directed toward the connecting web 23 and the connecting web is provided with a small perforation 33 to expose the bolt head so that the bolt may be readily operated while the handle is in its flush or latched position. When the latch is in its closed position, slidable bearing surfaces 34 of the bifurcated portion of the latch arm engage the shaft 4.

Operation of the flush mounted latch is as follows:

The latch opens and closes in the manner fully set forth in the above-identified patent. More specifically, the latch as shown in FIG. 1 is in its flush condition and the trigger lever includes a web not shown which is flush with the connecting web 3. The trigger lever may be manually tilted to disengage the cross pin 16 whereupon the spring 22 causes the extended end of the handle to raise sufficiently to be manually engaged. The amount of movement is determined by the arcuate extent of the slots which correspond to the slots 9, but do not permit relative radial movement of the handle and latch arm. Once the handle is grasped, it may be tilted further causing the latch arm 6 to move in a direction so as to disengage the keeper member 11. It is customary to provide some adjustment for the keeper member 11, but it is difficult to make an accurate adjustment, for it must be done when the latch arm is disengaged.

Operation of the present invention is as follows:

With the latch in its closed position as illustrated in the several views, the adjustment bolt 27 is readily accessible through the perforation 33. When the bolt is in its raised position as indicated in FIG. 4, the top of the bolt is essentially flush with the surrounding surface and the lever arm is in its extended position as indicated by "E" in FIGS. 1 and 4. When the adjustment bolt is screwed downward, the wedge bar 28 spreads the shafts 4 and 8 causing the latch arm 6 to move to its retracted position as indicated by "R" in FIGS. 1 and 5.

It will be noted that the amount of adjustment required is not substantial. It has been determined that a longitudinal displacement of the latch bar in the order of ⅛th of an inch is adequate.

Reference is now directed to FIGS. 9 through 12.

The embodiment herein illustrated utilizes the handle 1, tubular pivot shaft 4, journal pin 5, latch arm 6 and journal shaft 8. In place of the link plates 17, there is provided a link structure 35 having link elements 36 similar to the link plates 17. The link elements 36 include bearing perforations 37 which journal the journal shaft 8 and movement control slots 38 which receive the tubular pivot shaft 4. The upper sides of the link elements 36 are joined by a cross web 39 having a screw-threaded boss 40 directed toward the tubular pivot shaft 4. The screw-threaded boss 40 receives an adjustment screw member 41 having an axially directed thrust pin 42 which engages a thrust plate 43 having a cylindrically curved face 44 contoured to fit the tubular pivot shaft 4.

As in the first-described embodiment, the handle 1 is provided with an exposure perforation 33 providing access to the screw member 41.

The relative movements of the handle 1, latch pin 6 and trigger lever 12 is essentially the same as in the first embodiment including the movement control slots 9 permitting limited arcuate movement of the handle with respect to the journal shaft 8 and radial movement of the journal shaft 8 with respect to the tubular pivot shaft 4 as shown in FIG. 10. Also a spring 45 is provided which performs the same function as the spring 30, mainly to lift the handle for manual engagement.

When the latch is in its closed position shown in FIGS. 9, 10, 11 and 12, the screw member 41 which has a hexagonal socket, not shown, is exposed for engagement by an appropriate tool. When the thrust pin 42 is in its extended position shown in FIG. 11, the latch arm 6 is in its retracted position as represented by "R". As shown in FIG. 12, when the thrust pin 42 is retracted, the latch arm 6 is in its extended position represented by "E" in FIG. 12.

Figure 16:
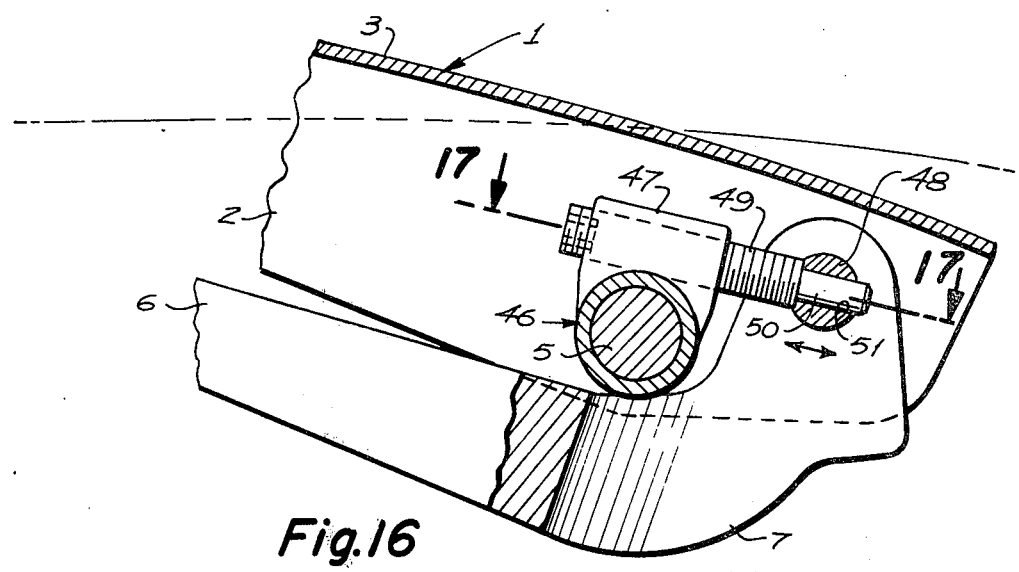
Figure 17:
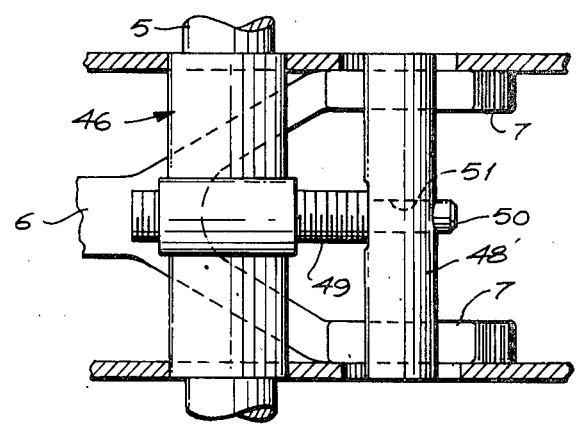

Referring to the embodiment of the latch shown in FIGS. 15, 16 and 17, again the handle 1, latch arm 6 and trigger lever 12 are essentially the same as in the previously described embodiment. In place of the tubular pivot shaft 4, a pivot shaft or sleeve 46 is provided which includes an internally screw-threaded transverse boss 47 directed toward a journal shaft 48 corresponding to the journal shaft 8. The boss 47 receives an adjustment screw 49 which is directed toward the journal shaft 48. The adjustment screw is provided with an end pin 50 which is received in a cross bore 51 provided in the journal shaft 48. As in the previous embodiments, the handle 1 is provided with a movement control slot 9 to permit adjustment movement of the journal shaft 48 and also to provide the limited free movement of the handle when the trigger lever 12 is released. This limited free movement of the handle is utilized to provide access to the adjustment screw 49.

Having fully described my invention, it is to be understood that I am not to be limited to the details herein set forth, but that my invention is of the full scope of the appended claims.

I claim:

1. The combination with a latch structure including a manually pivotable handle about a first shaft between a closed position and an angular exposed position; and a hook latch pivotably attached to the handle for a movement of its attached end about a second shaft carried by the handle whereby the extended end of the hook latch moves in an essentially longitudinal direction for engagement with or disengagement from a keeper, of a latch adjustment means, comprising:
   a. means for permitting relative displacement of the first and second shafts while the shafts remain in parallel relation;
   b. screwthreaded means extending between the shafts to effect such relative displacement thereby to change the stress exerted between the hook latch and its keeper;

c. the screwthreaded means including a screw member extending between the shafts, a screwthreaded anchor bar engaging one side of the two shafts, and a wedge member exerting a spreading force between the shafts;

d. and an aperture in the handle providing access to the screwthreaded means while the hook latch and keeper are engaged.

2. A latch structure, comprising:

a. a pivotable handle member having a first shaft defining a fulcrum axis near one end;

b. a latching member having a second shaft pivotally connected to the handle member between said fulcrum axis and said one end, the latching member traversing and extending beyond said fulcrum axis toward the other end of the handle member, the latching member having a hook at its extended end for engaging a keeper to subject the latching member to a tension load;

c. tension adjustment means including a screw member extending between the shafts, and relatively movable elements forming wedge means operable by the screw member to exert a spreading force between the shafts and an access aperture in the handle member exposing an end of the screw member.

3. A latch adjustment means, as defined in claim 1, wherein:

a. the screwthreaded means includes a linkage joining the shafts and permitting said relative displacement, an internally screwthreaded element carried by the linkage and exposed through the handle, and a screwthreaded shaft carried by the internally screwthreaded element and engaging one of the shafts to exert a force to effect said relative displacement.

4. A latch adjustment means, as defined in claim 2, wherein:

a. the screwthreaded means includes a sleeve carried by one of the shafts, the sleeve having an internally screwthreaded boss, and a screwthreaded shaft received in the boss extending into engagement with the other shaft.

5. A latch structure for adjustable engagement with a keeper, comprising:

a. a pivotable handle member having a fulcrum axis;

b. a latching member pivotally connected to the handle member at a second axis spaced from said fulcrum axis and having a hook at its extended end for engaging the keeper;

c. adjustment means interposed between the fulcrum axis and the second axis for changing the spacing therebetween thereby to change the engagement between the keeper and the latching member, said adjustment means including a wedge element, and means for forcing the wedge element between the fulcrum axis and the second axis, for increasing the spacing therebetween and permitting retraction of the wedge element to decrease the spacing therebetween; and d. means providing access to the adjustment means while the keeper and latching means are in engagement.

6. A latch structure, as defined in claim 5, wherein:

a. the adjustment means includes a linkage permitting limited change in the spacing between the axes and adjustment is effected by extensible and retractable means carried by the linkage.

7. A latch structure, as defined in claim 5, wherein:

a. shafts define the axes;

b. the adjustment means includes a sleeve fitting one of the shafts and extensible and retractable means is carried by the sleeve and engages the other shaft.

* * * * *